(12) United States Patent
Caverly et al.

(10) Patent No.: US 12,286,148 B1
(45) Date of Patent: Apr. 29, 2025

(54) SELF-CENTERING TELESCOPE GUIDANCE MECHANISM FOR ADJUSTABLE COLUMNS

(71) Applicant: Steering Solutions IP Holding Corporation, Saginaw, MI (US)

(72) Inventors: Jacob A. Caverly, Freeland, MI (US); Randy W. Jones, North Branch, MI (US); Michael C. Vermeersch, Flushing, MI (US); Scott A Stinebring, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/584,957

(22) Filed: Feb. 22, 2024

Related U.S. Application Data

(60) Provisional application No. 63/546,328, filed on Oct. 30, 2023.

(51) Int. Cl.
*B62D 1/185* (2006.01)
(52) U.S. Cl.
CPC .................................. *B62D 1/185* (2013.01)
(58) Field of Classification Search
CPC ..................................................... B62D 1/185
See application file for complete search history.

(56) References Cited

U.S. PATENT DOCUMENTS

| | | | | |
|---|---|---|---|---|
| 8,485,554 | B2* | 7/2013 | Osuka | B62D 1/195 280/775 |
| 2014/0069223 | A1* | 3/2014 | Bang | B62D 1/185 74/493 |
| 2014/0290423 | A1* | 10/2014 | Kogure | B62D 1/195 74/493 |
| 2015/0232117 | A1* | 8/2015 | Stinebring | B62D 1/181 74/493 |
| 2017/0313343 | A1* | 11/2017 | Kim | B62D 1/184 |
| 2018/0001922 | A1* | 1/2018 | Gstöhl | B62D 1/192 |

* cited by examiner

*Primary Examiner* — Paul N Dickson
*Assistant Examiner* — Shams Dhanani
(74) *Attorney, Agent, or Firm* — Dickinson Wright PLLC

(57) ABSTRACT

A steering column jacket assembly for a steering system of motor vehicle includes a first steering jacket extending along a longitudinal axis and a second steering jacket arranged for telescoping movement relative to the first steering jacket along the longitudinal axis. A guide bracket is fixed to the second steering jacket. The guide bracket has a guide bushing disposed between the guide bracket and the first steering jacket, the guide bushing self-centering the first steering jacket and the second steering jacket relative to one another to inhibit relative rotation between the first steering jacket and the second steering jacket.

20 Claims, 8 Drawing Sheets

Fixing a Guide Bracket 20 to the Second Steering Jacket 16, and Disposing a Guide Bushing 22 Between the Guide Bracket 20 and the First Steering Jacket 14, with the Guide Bushing 22 Self-Centering the First Steering Jacket 14 and the Second Steering Jacket 16 Relative to One Another to Inhibit Relative Rotation between the First Steering Jacket 14 and the Second Steering Jacket 16.

Providing the Guide Bushing 22 as an Elastic, Non-Metal Material.

Providing the First Steering Jacket 14 Having a Pair of Guide Rails 24 Fixed Thereto and Establishing an Interference Fit of the Guide Bushing 22 Between the Guide Bracket 20 and the Pair of Guide Rails 24.

Providing the Guide Bushing 22 having a Tubular Wall 28 Bounding a Hollow Core 30, Providing the Guide Bracket 20 having a Post 37, and Fixing the Guide Bushing 22 to the Guide Bracket 20 by Disposing the Post 37 into the Hollow Core 30.

Providing the Tubular Wall 28 having a Dog-Bone-Shape, as Viewed Looking Along the Longitudinal Axis A, having a Pair of Opposite Ends Formed by Enlarged Ears 32 with a Pair of Planar Walls 34 Interconnecting the Enlarged Ears 32, with a Portion 38a of an Outer Surface 38 of Each Enlarged Ear 32 Forming the Interference Fit Between the Guide Bracket 20 and the Pair of Guide Rails 24.

Providing the Portions 38a of the Outer Surfaces 38, Forming the Interference Fit Between the Guide Bracket 20 and the Pair of Guide Rails 24, in Parallel Relation with One Another.

FIG. 7

SELF-CENTERING TELESCOPE GUIDANCE MECHANISM FOR ADJUSTABLE COLUMNS

CROSS-REFERENCE TO RELATED APPLICATION

This application claims the benefit of U.S. Provisional Application Ser. No. 63/546,328, filed Oct. 30, 2023, which is incorporated herein by reference in its entirety.

BACKGROUND

Many motor vehicles include telescoping steering column having an upper steering jacket that adjustably telescopes relative to a lower steering jacket. During telescoping moving, it is important to guide the upper and lower steering jackets relative to one another to prevent them from rotating relative to one another to keep various components from moving out of their intended radial position, such as switches and sensors, including wash/wipe/turn signal switches, for example. It is also important to prevent relative rotation between the upper and lower steering column jackets as a torque is applied to various components, such as the aforementioned wash/wipe/turn signal switches, for example. Further yet, with the increased implementation of driver eye-tracking technologies, such as cameras, which can be very sensitive to misalignment of the upper steering jacket, such as to about 2 degrees of rotational misalignment, added emphasis has been placed on maintaining proper alignment/positioning of the upper steering jacket.

While maintaining alignment of the upper and lower steering jackets relative to one another, even during application of torsion loading on the upper steering jacket, such as may occur while using wash/wipe/turn signal switches, it is important to allow relative telescoping movement while minimizing the amount of noise generated during telescoping movement. Accordingly, it is important that any rotational play, also referred to as rotational clearance or slop, between the upper and lower steering jackets be removed, while also minimizing friction between the upper and lower steering jackets during intended telescoping movement. Further yet, it is important that noise generation is prevented during telescoping movement, and thus, metal-on-metal contact is generally undesirable.

A steering column jacket assembly constructed in accordance with the disclosure herein addresses at least those issues noted above, while providing a robust, quasi-compliant joint between components of the steering column jacket assembly, is self-sizing to accommodate dimensional stack-up scenarios, while being economical in manufacture, assembly and in use.

SUMMARY

According to one aspect of the disclosure, a steering column jacket assembly for a steering system of motor vehicle includes a first steering jacket extending along a longitudinal axis and a second steering jacket arranged for telescoping movement relative to the first steering jacket along the longitudinal axis. A guide bracket is fixed to the second steering jacket. The guide bracket has a guide bushing disposed between the guide bracket and the first steering jacket. The guide bushing self-centering the first steering jacket and the second steering jacket relative to one another and inhibiting relative rotation between the first steering jacket and the second steering jacket.

In accordance with another aspect of the disclosure, a method of self-centering a first steering jacket relative to a second steering jacket of a steering column jacket assembly of a motor vehicle as the second steering jacket moves telescopically relative to the first steering jacket along a longitudinal axis is provided. The method includes a step of fixing a guide bracket to the second steering jacket, and disposing a guide bushing between the guide bracket and the first steering jacket, with the guide bushing self-centering the first steering jacket and the second steering jacket relative to one another to inhibit relative rotation between the first steering jacket and the second steering jacket.

These and other advantages and features will become apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 7 is a flow diagram illustrating a method of self-centering a first steering jacket relative to a second steering jacket of a steering column jacket assembly of a motor vehicle as the second steering jacket moves telescopically relative to the first steering jacket along a longitudinal axis in accordance with another aspect of the disclosure.

DETAILED DESCRIPTION

Referring now to the Figures, the embodiments described herein are used in conjunction with a steering assembly of a motor vehicle, such as a car, truck, sport utility vehicle, crossover, mini-van, marine craft, aircraft, all-terrain vehicle, recreational vehicle, or other suitable vehicles, including various steering system schemes.

Figure 1:
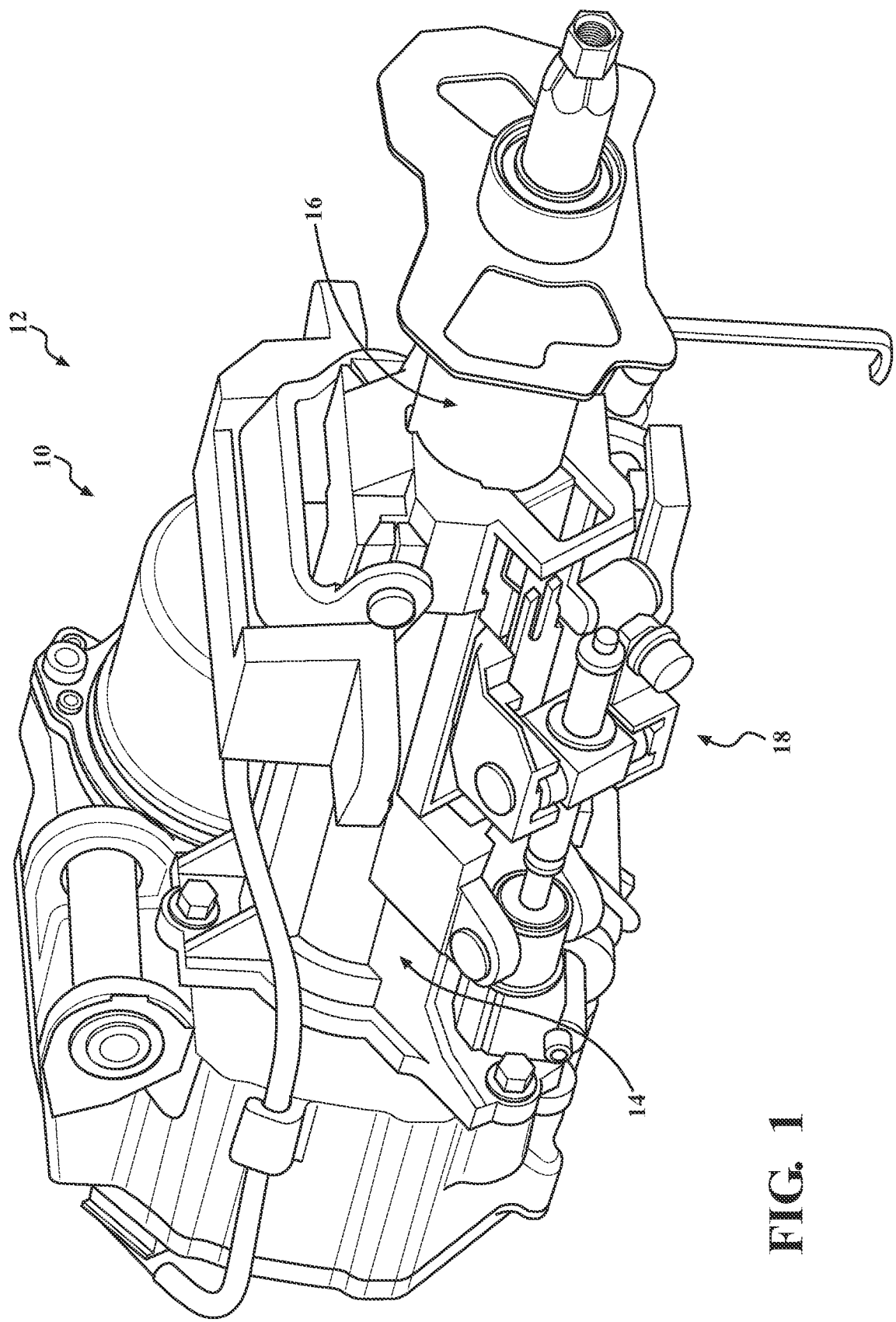
FIG. 1 is a perspective view of a steering column jacket assembly of a steering system for a motor vehicle in accordance with one aspect of the disclosure.
Figure 2A:
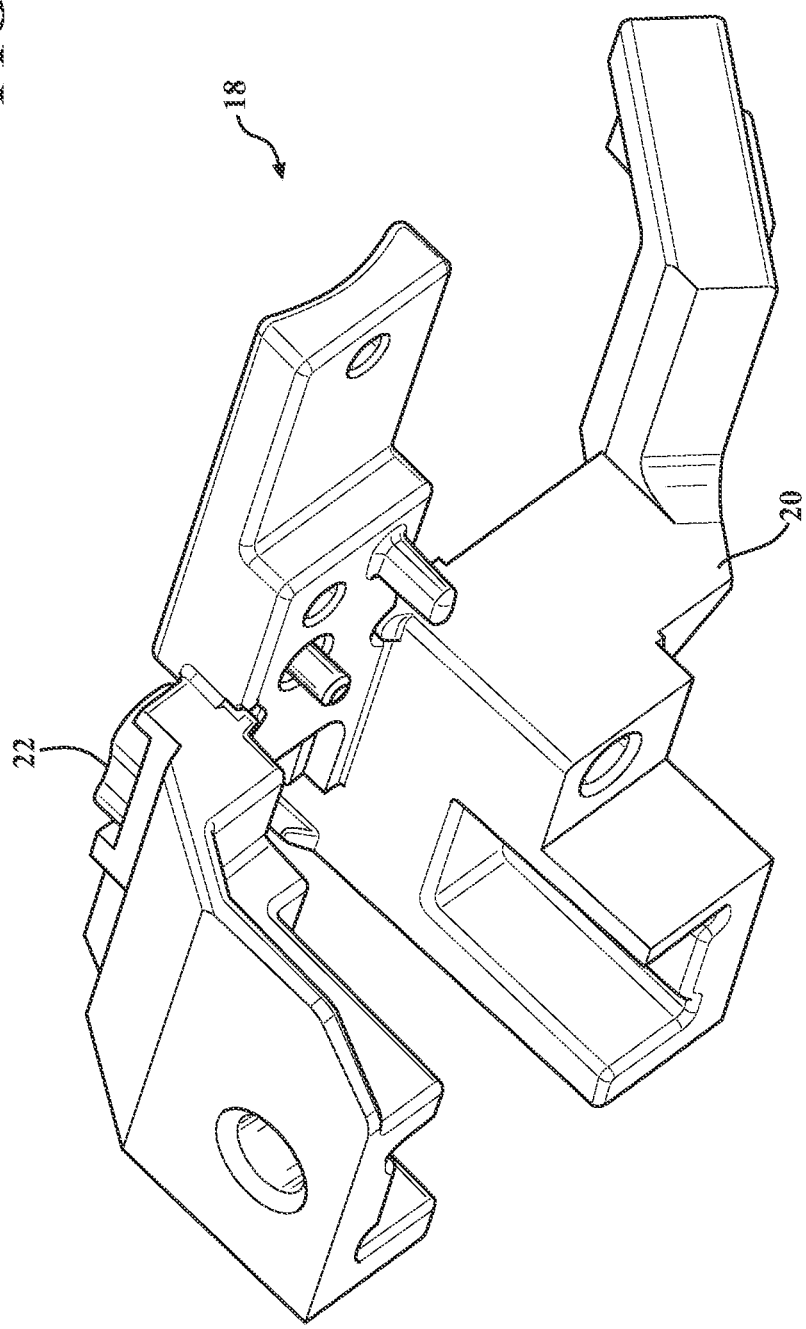
FIG. 2A is an enlarged perspective view of an encircled area 2 of a drive bracket and guide bushing assembly of FIG. 1.
Figure 2B:
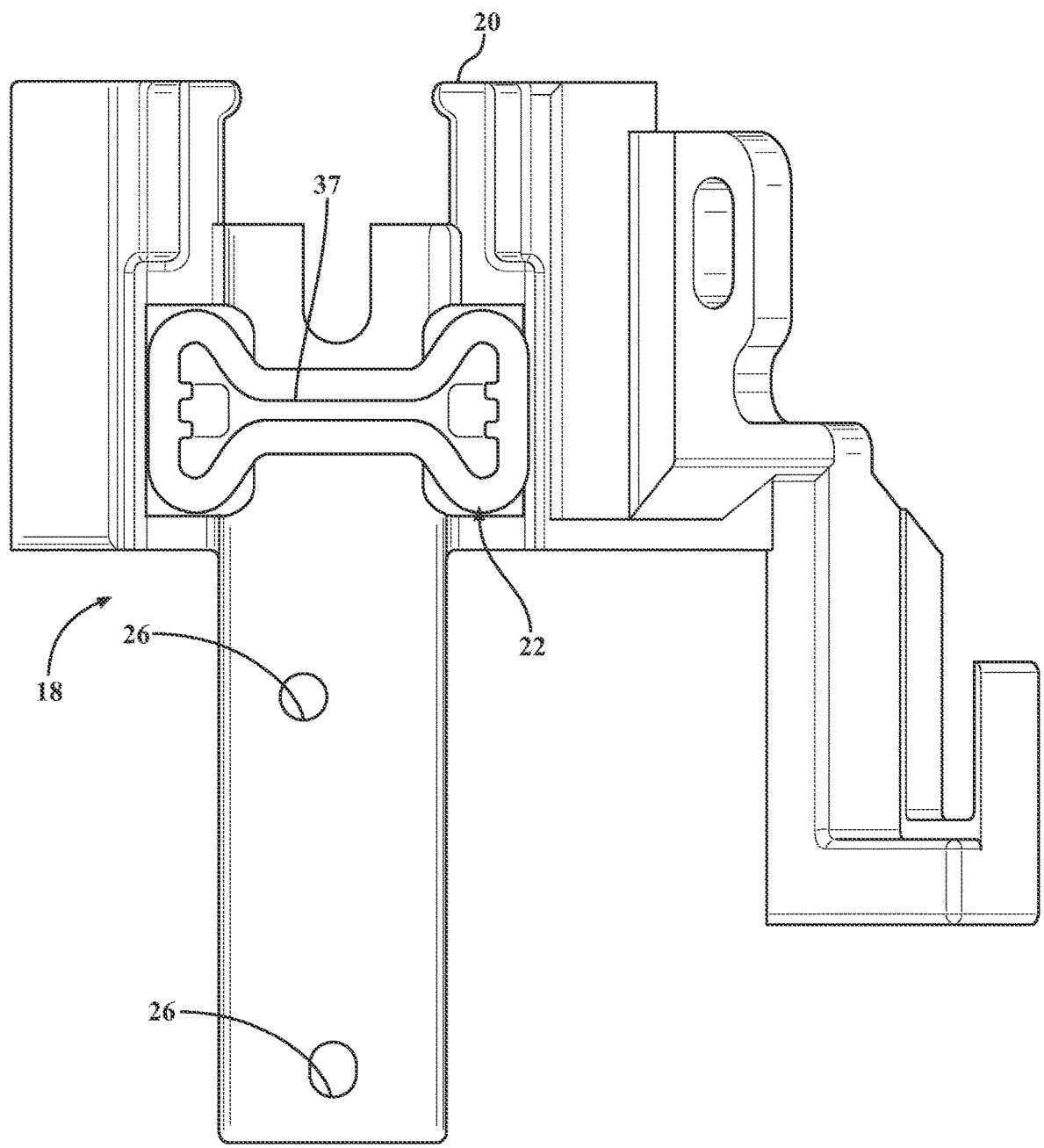
FIG. 2B is a plan view of the drive bracket and guide bushing assembly looking generally along the arrow 2B of FIG. 2A.

Referring initially to FIG. 1, a steering column jacket assembly 10 of a steering system 12 for a motor vehicle includes a plurality of telescoping steering jackets, including a first steering jacket, shown as a lower steering jacket 14 extending along a longitudinal axis A, and a second steering jacket, shown as an upper steering jacket 16, configured for telescoping movement relative to the lower steering jacket 14 along the longitudinal axis A. A guide bracket assembly 18 is fixed to the second steering jacket 16. The guide bracket assembly 18 includes a guide bracket 20 having a guide bushing 22 disposed between the guide bracket 20 and the first steering jacket 14. The guide bushing 22 acts as a self-centering member, self-centering the first steering jacket 14 and the second steering jacket 16 relative to one another to inhibit relative rotation between the first steering jacket 14 and the second steering jacket 16.

Figure 3:
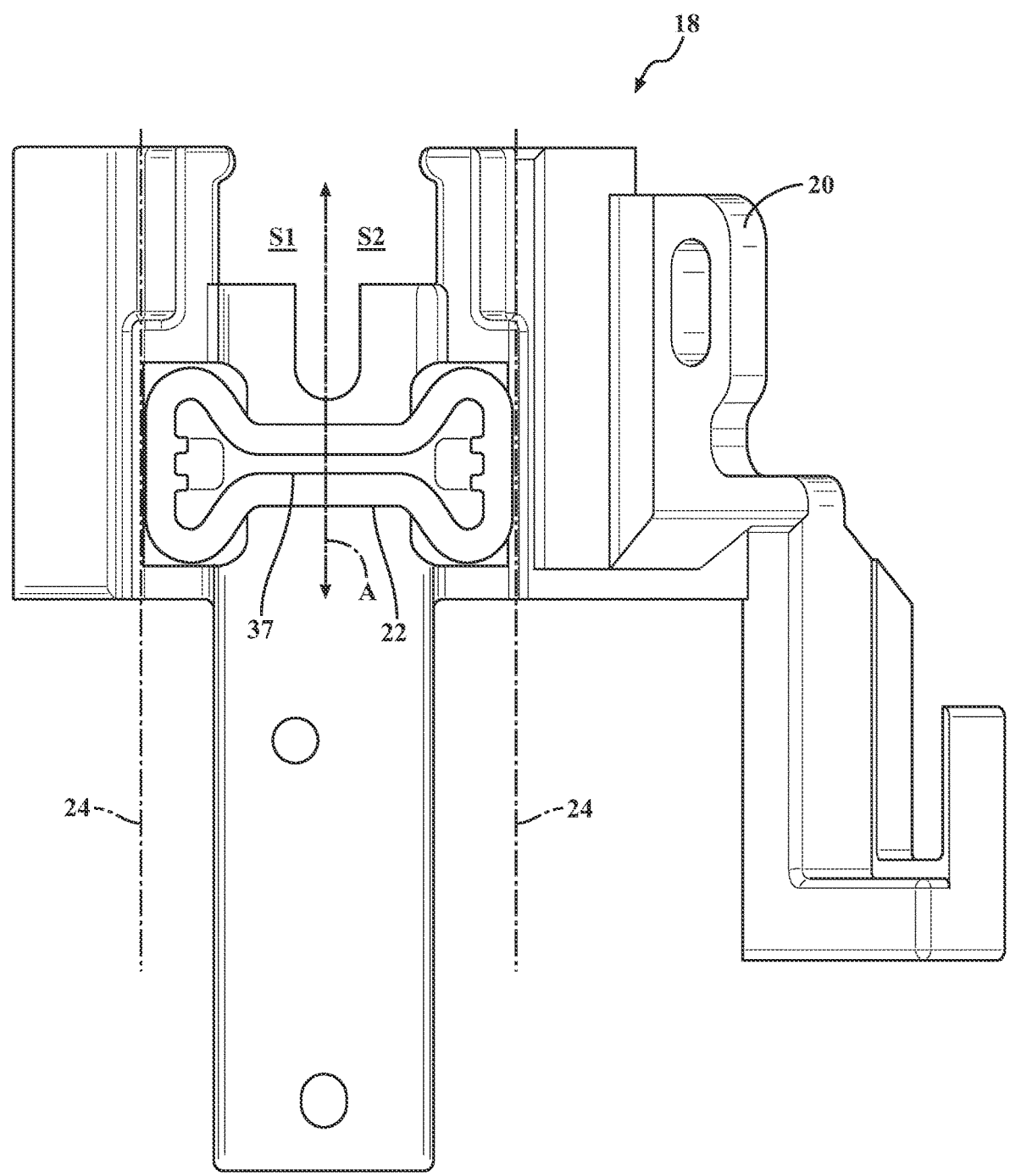
FIG. 3 is a view similar to FIG. 2B schematically illustrating guide rails on a lower steering jacket of the steering column jacket assembly of FIG. 1, showing the guide bushing of the mount bracket and bushing assembly interacting with the guide rails.

The lower steering jacket 14 includes at least one guide rail 24 fixed thereto, wherein the guide bushing 22 is disposed in an interference fit between the guide bracket 20 and the at least one guide rail 24. The at least one guide rail 24 is shown schematically (FIG. 3), by way of example and without limitation, including a pair of guide rails 24 laterally spaced in true parallel or generally parallel, with generally meaning the guide rails 24 could have a slight variation from true parallel, such off by between about 0.1-2 degrees from true parallel, by way of example and without limitation, relation with one another. Guide rails 24 can be formed as a monolithic piece of material with lower steering jacket 14, or as separate pieces of material subsequently fixed to lower steering jacket 14, such that guide rails 24 do not move relative to the lower steering jacket 14.

Guide bracket 20 can be fixed to upper steering jacket 16 via any desired mechanism, such as via weld joint(s), one or more fasteners (such as threaded fastener(s)), not shown), disposed through corresponding opening(s) 26 and into opening(s) of upper steering jacket 16, by way of example and without limitation, or other fastening mechanism.

Figure 5:
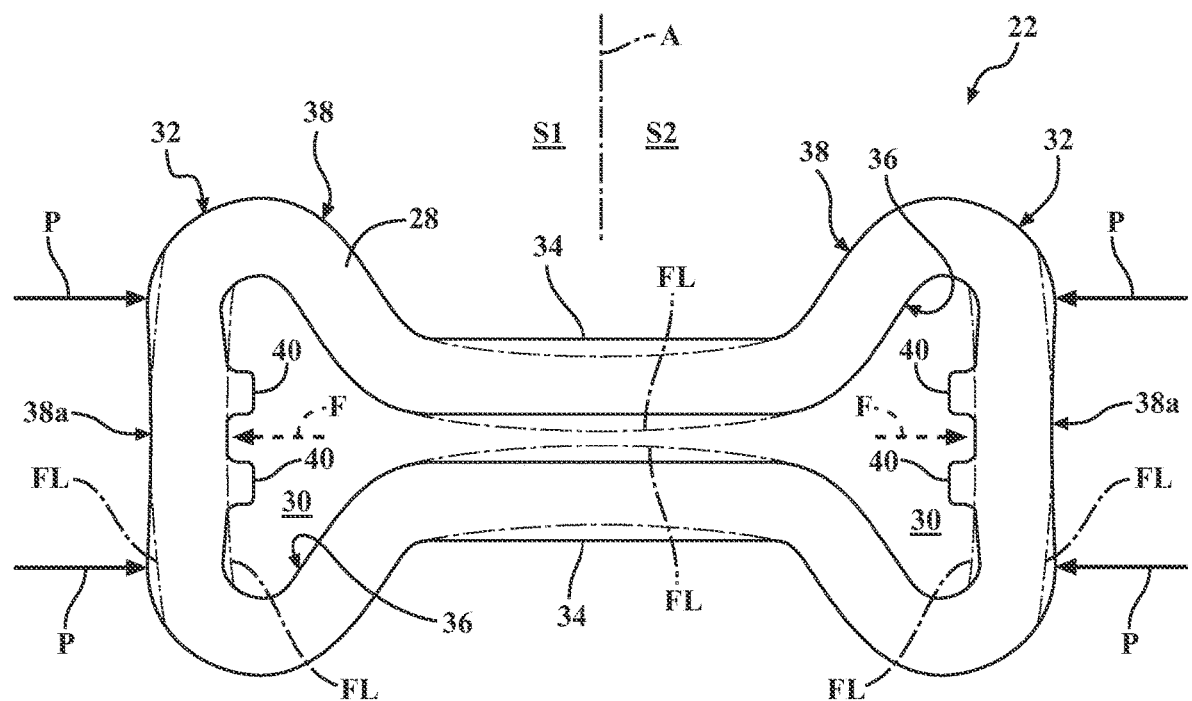
FIG. 5 is a plan view of the guide bushing illustrating compression and reactionary loads imparted across the guide bushing, along with self-sizing elastic flexure of the guide bushing.

The guide bushing 22 is formed of a non-metal material, and in a non-limiting embodiment, from a lubricious polymeric material. The polymeric material prevents the generation of noise as the guide bracket 20, with upper steering jacket 16 fixed thereto, translate telescopically along guide rails 24 fixed to lower steering jacket 14. The guide bushing 22, as best shown in FIG. 5 (reference numerals are applied only to FIG. 5 for some of the guide bushing features solely to avoid cluttering the remaining FIGS.), can be formed as a monolithic piece of material having a tubular wall 28 bounding a hollow cavity, also referred to as core 30. The tubular wall 28 is dog-bone-shaped, as viewed looking along the longitudinal axis A, as shown in FIG. 5, having a pair of opposite ends formed by enlarged ears 32, with a pair of planar walls 34 providing a cross brace interconnecting the enlarged ears 32. The planar walls 34 extend in parallel relation with one another between the opposite enlarged ears 32. The tubular wall 28 has an inner surface 36 bounding the core 30.

The inner surface 36 of the tubular wall 28 is fixed and extends about a protruding boss, also referred to as post 37, which extends from guide bracket 20 radially outwardly from axis A. The tubular wall 28 of guide bushing 22 can be fixed to the post 37 via an interference fit, thereby fixed guide bushing 22 to the guide bracket 20. Oppositely facing portions 38a of an outer surface 38 of the tubular wall 28, extending along ends of the enlarged ears 32 in generally parallel relation with one another, slidably engage the first steering jacket 14 for low friction movement there against, and in particular, against the guide rails 24 of the lower steering jacket 14. Upon assembling guide bracket assembly 18 to upper steering bracket 16, with guide bushing 22 disposed on post 37 and captured between guide bracket 20 and guide rails 24, the guide bushing 22 is prevented from being removed from guide bracket 20 without first removing guide bracket assembly 18 from upper steering jacket 16.

Figure 4:
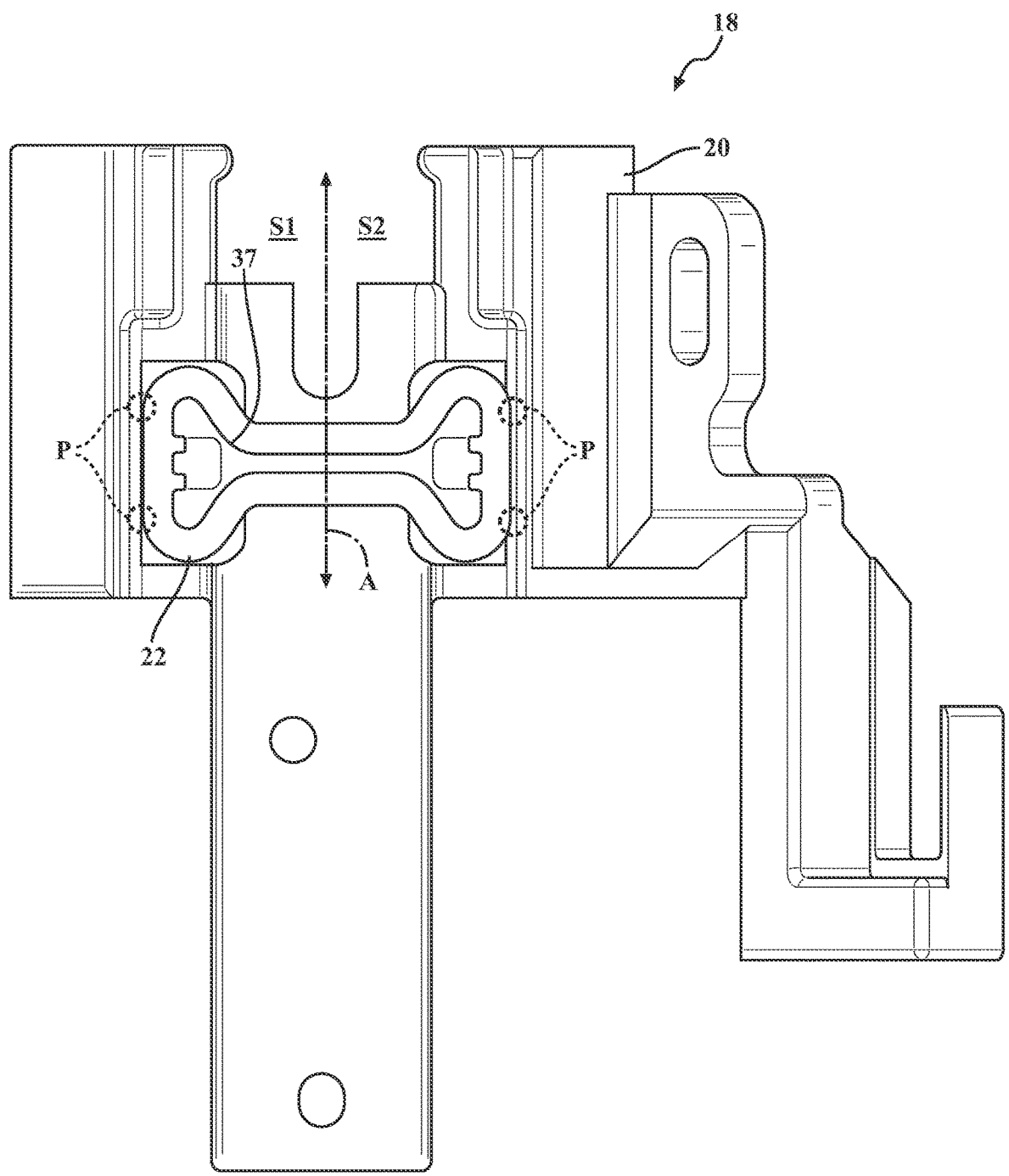
FIG. 4 is a view similar to FIG. 3 schematically illustrating reaction locations between the guide bushing and the guide rails of the lower steering jacket.

At least one protrusion extends inwardly from the inner surface 36 of the tubular wall 28 for fixed receipt in a corresponding notch of the guide bracket 20, wherein the at least one protrusion is shown, by way of example and without limitation, as including a plurality of protrusions 40 spaced from one another. The first plurality, shown as a pair, of the laterally spaced protrusions 40 extends inwardly from the inner surface 36 of one ear 32, and a second plurality, shown as a pair, of the laterally spaced protrusions 40 extends inwardly from the inner surface 36 of the other ear 32. The guide bushing 22 is shown as being symmetrical relative to the longitudinal axis A, such that half of the guide bushing 22 on one side S1 of the longitudinal axis A mirrors an opposite half of the guide bushing 22 on the other side S2 of the longitudinal axis A, as would be understood by a skilled artisan in view of FIGS. 2B, 3, 4, and 5, thereby being economical in manufacture, such as via an extrusion process, by way of example and without limitation, and economical in assembly, not being orientation sensitive in assembly of guide bushing 22 to guide bracket 20. The dog bone shape results in points P of compression from the guide rails 24 (FIGS. 4 and 5) spaced from one another adjacent opposite sides of the oppositely facing portions 38a of the outer surface 38 of opposite ends of the ears 32, and opposing reactionary forces F from the guide bracket 20 between the protrusions 40. With the guide bushing 22 being a resilient, elastic material, self-sizing resilient, elastic flexure is provided during use, as indicated by the dashed flexural lines FL of FIG. 5, thereby acting as a self-locating leaf spring, while the cross brace formed by planar walls 34 functions as a support member to increase the stability of guide bushing 22.

Figure 6:
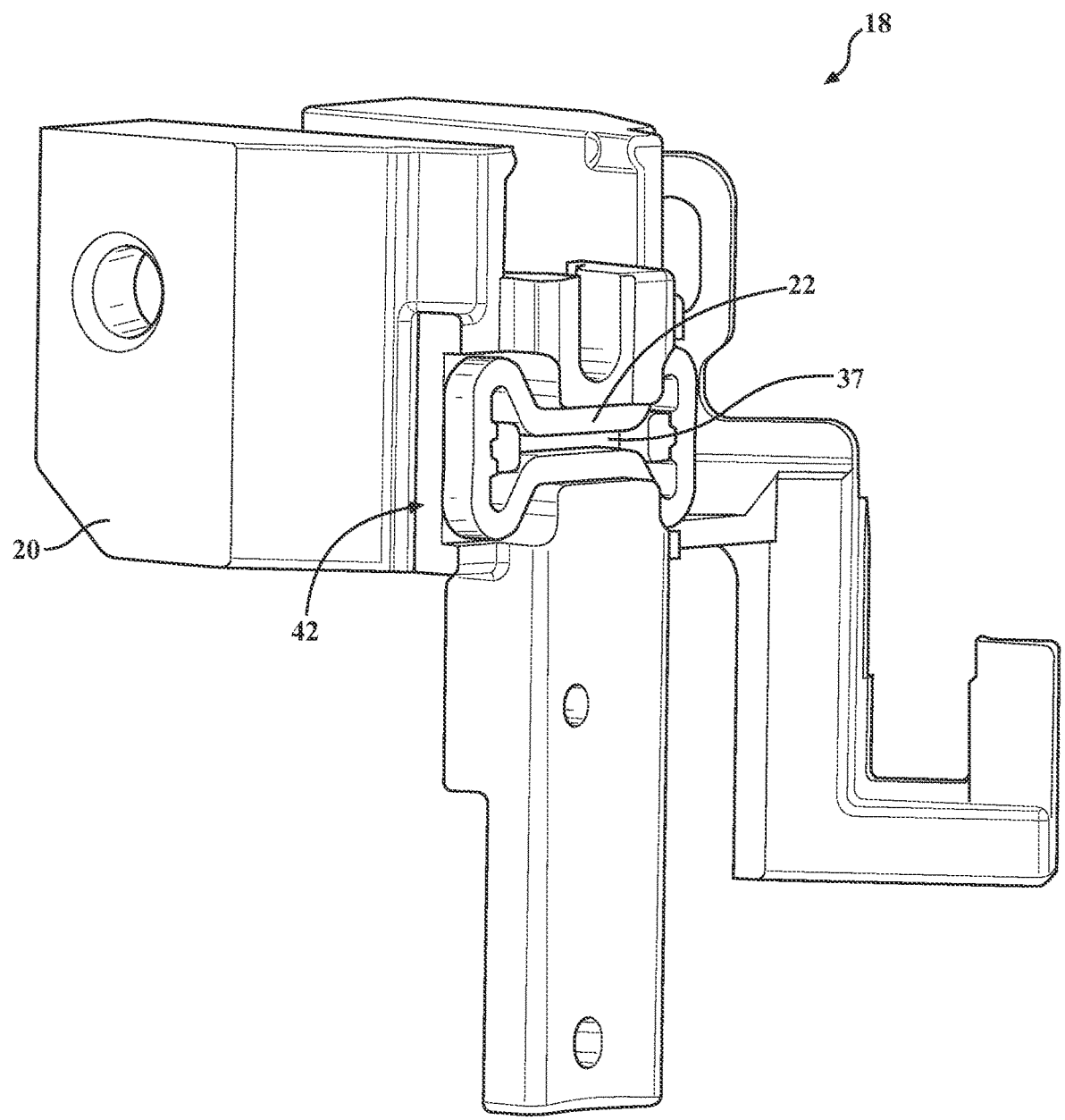
FIG. 6 is perspective view of the drive bracket and guide bushing assembly showing an integrated compression limiter thereof.

An integrated compression limiting surface(s), also referred to as compression limiter 42 (FIG. 6), having an elasticity less than guide bushing 20, can be provided on guide bracket 20 to relieve guide bushing 22 of load-carrying in extreme load carrying situations. If a predetermined load is reached or exceeded, compression limiting surface 42, having an elasticity less than guide bushing 20, can contact guide rail(s) 24, thereby preventing overstressing of, and damage to the guide bushing 22.

The guide bracket assembly 18, as discussed above, acts to self-center the upper steering jacket 16, during telescoping movement, relative to the lower steering bracket 14; provides for quiet telescoping movement of the upper steering jacket 16 during telescoping movement relative to the lower steering bracket 14; is robust to react against excessive loading between the upper steering jacket 16 and the lower steering bracket 14; is economical in manufacture and assembly, particularly given it is symmetrical and does not require a one-way assembly orientation; and is readily accepting of long telescoping movement, such as when moving upper steering jacket 16 to a fully collapsed, "stow" position.

In accordance with another aspect of the disclosure, as illustrated in FIG. 7, a method 1000 of self-centering a first steering jacket 14 relative to a second steering jacket 16 of a steering column jacket assembly 10 of a motor vehicle as the second steering jacket 16 moves telescopically relative to the first steering jacket 14 along a longitudinal axis A is provided. The method 1000 includes a step 1100 of fixing a guide bracket 20 to the second steering jacket 16, and disposing a guide bushing 22 between the guide bracket 20 and the first steering jacket 14, with the guide bushing 22 self-centering the first steering jacket 14 and the second steering jacket 16 relative to one another to inhibit relative rotation between the first steering jacket 14 and the second steering jacket 16.

The method 1000 can further include a step 1200 of providing the guide bushing 22 as an elastic, non-metal material.

The method 1000 can further include a step 1300 of providing the first steering jacket 14 having a pair of guide rails 24 fixed thereto and establishing an interference fit of the guide bushing 22 between the guide bracket 20 and the pair of guide rails 24.

The method 1000 can further include a step 1400 of providing the guide bushing 22 having a tubular wall 28 bounding a hollow core 30, providing the guide bracket 20 having a post 37, and fixing the guide bushing 22 to the guide bracket 20 by disposing the post 37 into the hollow core 30.

The method 1000 can further include a step 1500 of providing the tubular wall 28 having a dog-bone-shape, as viewed looking along the longitudinal axis A, having a pair of opposite ends formed by enlarged ears 32 with a pair of planar walls 34 interconnecting the enlarged ears 32, with a portion 38a of an outer surface 38 of each enlarged ear 32 forming the interference fit between the guide bracket 20 and the pair of guide rails 24.

The method 1000 can further include a step 1600 of providing the portions 38a of the outer surfaces 38, forming the interference fit between the guide bracket 20 and the pair of guide rails 24, in parallel relation with one another.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

We claim:

1. A steering column jacket assembly of a steering system for a motor vehicle, comprising:
    a first steering jacket extending along a longitudinal axis;
    a second steering jacket arranged for telescoping movement relative to the first steering jacket along the longitudinal axis; and
    a guide bracket fixed to the second steering jacket, the guide bracket having a guide bushing disposed between the guide bracket and the first steering jacket, the guide bushing self-centering the first steering jacket and the second steering jacket relative to one another to inhibit relative rotation between the first steering jacket and the second steering jacket.

2. The steering column jacket assembly of claim 1, wherein the guide bushing is an elastic, non-metal material.

3. The steering column jacket assembly of claim 2, wherein the guide bushing is a polymeric material.

4. The steering column jacket assembly of claim 1, further including at least one guide rail fixed to the first steering jacket, the guide bushing disposed in an interference fit between the guide bracket and the at least one guide rail.

5. The steering column jacket assembly of claim 4, wherein the at least one guide rail including a pair of guide rails laterally spaced in generally parallel relation with one another.

6. The steering column jacket assembly of any one of claim 1, wherein the guide bushing is a monolithic piece of material.

7. The steering column jacket assembly of claim 6, wherein the guide bushing has a tubular wall bounding a hollow core.

8. The steering column jacket assembly of claim 7, wherein the tubular wall is dog-bone-shaped as viewed looking along the longitudinal axis, having a pair of opposite ends formed by enlarged ears, with a pair of planar walls interconnecting the enlarged ears.

9. The steering column jacket assembly of claim 8, wherein an inner surface of the tubular wall is fixed about a post of the guide bracket and an outer surface of each enlarged ear engages the first steering jacket.

10. The steering column jacket assembly of claim 9, wherein at least one protrusion extends inwardly from the inner surface of the tubular wall for fixed receipt in a corresponding notch of the guide bracket.

11. The steering column jacket assembly of claim 10, wherein the at least one protrusion includes a plurality of protrusions spaced from one another.

12. The steering column jacket assembly of claim 10, wherein the at least one protrusion extends inwardly from the inner surface of the enlarged ears.

13. The steering column jacket assembly of claim 12, wherein the at least one protrusion extends inwardly from the inner surface of the enlarged ears.

14. The steering column jacket assembly of claim 1, wherein the guide bushing is symmetrical relative to the longitudinal axis.

15. A method of self-centering a first steering jacket relative to a second steering jacket of a steering column jacket assembly of a motor vehicle as the second steering jacket moves telescopically relative to the first steering jacket along a longitudinal axis, comprising:
    fixing a guide bracket to the second steering jacket; and
    disposing a guide bushing between the guide bracket and the first steering jacket, with the guide bushing self-centering the first steering jacket and the second steering jacket relative to one another to inhibit relative rotation between the first steering jacket and the second steering jacket.

16. The method of claim 15, further including providing the guide bushing as an elastic, non-metal material.

17. The method of claim 16, further including providing the first steering jacket having a pair of guide rails fixed thereto and establishing an interference fit of the guide bushing between the guide bracket and the pair of guide rails.

18. The method of claim 17, further including providing the guide bushing having a tubular wall bounding a hollow core, providing the guide bracket having a post, and fixing the guide bushing to the guide bracket by disposing the post into the hollow core.

19. The method of claim 18, further including providing the tubular wall having a dog-bone-shape as viewed looking along the longitudinal axis, having a pair of opposite ends formed by enlarged ears with a pair of planar walls interconnecting the enlarged ears, with a portion of an outer surface of each enlarged ear forming the interference fit between the guide bracket and the pair of guide rails.

20. The method of claim 19, further including providing the portions of the outer surfaces, forming the interference fit between the guide bracket and the pair of guide rails, in parallel relation with one another.

* * * * *